United States Patent
Yoshida

(10) Patent No.: US 8,391,114 B2
(45) Date of Patent: Mar. 5, 2013

(54) OPTICAL DISK DRIVE

(75) Inventor: Ryo Yoshida, Tokyo (JP)

(73) Assignee: TEAC Corporation, Tama-shi, Tokyo (JP)

( * ) Notice: Subject to any disclaimer, the term of this patent is extended or adjusted under 35 U.S.C. 154(b) by 14 days.

(21) Appl. No.: 13/231,699

(22) Filed: Sep. 13, 2011

(65) Prior Publication Data

US 2012/0236698 A1    Sep. 20, 2012

(30) Foreign Application Priority Data

Mar. 17, 2011 (JP) ................. 2011-059831

(51) Int. Cl.
*G11B 15/52* (2006.01)
(52) U.S. Cl. .................. 369/47.51; 369/52.26
(58) Field of Classification Search .......... None
See application file for complete search history.

(56) References Cited

U.S. PATENT DOCUMENTS

| 7,046,600 | B2 | 5/2006 | Matsumoto |
| 2003/0036861 | A1 | 2/2003 | Matsumoto |
| 2007/0211594 | A1* | 9/2007 | Tomishima ........... 369/53.26 |
| 2007/0223335 | A1* | 9/2007 | Jung ................... 369/47.53 |
| 2008/0144468 | A1* | 6/2008 | Amano ................. 369/53.26 |
| 2010/0177609 | A1 | 7/2010 | Van endert |

FOREIGN PATENT DOCUMENTS

| JP | 2003115110 A | 4/2003 |
| JP | 2010500700 A | 1/2010 |
| WO | 2008020352 A2 | 2/2008 |

* cited by examiner

*Primary Examiner* — Paul Huber
(74) *Attorney, Agent, or Firm* — Seed IP Law Group PLLC

(57) ABSTRACT

An optical disk drive controls recording power with high accuracy in accordance with a measured β value and a target β value. A system controller of the optical disk drive determines a β value at which jitter or an error rate becomes minimum, in both an inner radius and an outer radius of an optical disk, and determines a difference between the determined β value and the target β value for each of the inner and outer radii. A corrected value for an arbitrary position, arbitrary speed, and an arbitrary temperature is calculated from a difference achieved at the inner radius and a difference achieved at the outer radius, by means of linear interpolation. The measured β value for the arbitrary position, the arbitrary speed, and the arbitrary temperature is compared with the target β value after having been corrected, thereby controlling recording power.

10 Claims, 3 Drawing Sheets

OPTICAL DISK DRIVE

PRIORITY INFORMATION

This application claims priority to Japanese Patent Application No. 2011-59831, filed on Mar. 17, 2011, which is incorporated herein by reference in its entirety.

BACKGROUND OF THE INVENTION

1. Technical Field

The present invention relates to an optical disk drive and, more particularly, to control of recording power.

2. Related Art

Recording power used during recording of data into an optical disk is controlled while a $\beta$ value is principally taken as an index. Specifically, a $\beta$ value, which is to serve as a target value, is previously determined for an optical disk to be recorded. Recording power is controlled in such a way that a $\beta$ value measured after data have been recorded in an optical disk comes to a target $\beta$ value.

JP 2010-500700 A discloses measuring a target $\beta$ value for an inner radius and another target $\beta$ value for an outer radius of an optical disk and subjecting these target $\beta$ values to linear interpolation, thereby calculating target $\beta$ values for respective speeds (i.e., at respective radial positions) in a data area on the optical disk.

JP 2003-115110 A discloses performing optimum power control (OPC) at a plurality of speeds when OPC in an inner radius of an optical disk to thereby measure target $\beta$ values and carrying out interpolation by means of linear interpolation for recording speeds at which measurement has not been performed, to thus calculate target $\beta$ values.

When recording power is controlled in such a way that a $\beta$ value determined through measurement matches a target $\beta$ value, control must be based on premise that the measured $\beta$ value is accurate. However, an error can arise in a measured $\beta$ value for various reasons. For this reason, a proposed procedure is for controlling recording power by use of a reference optical disk in a production line before shipment of optical disk drives in such a way that all of the optical disk drives provide the same measured $\beta$ value, and making a correction when data are actually recorded on an optical disk by use of the control value. However, there is no guarantee that a match will exist between conditions for performing control in the production line and conditions for actually recording data. For instance, variations can arise in temperature and speed during recording operation, which raises a problem of the correction being insufficient.

SUMMARY

The present invention provides an apparatus capable of making a correction to an error included in a $\beta$ value determined through measurement, thereby enabling accurate comparison of the measured $\beta$ value with a target $\beta$ value and highly accurate control of recording power, as well.

The present invention is directed toward an optical disk drive that controls recording power according to a measured $\beta$ value and a target $\beta$ value. The optical disk drive comprises: means for determining at a first position on an optical disk a $\beta$ value at which jitter becomes minimum and calculating a first difference between the $\beta$ value and a target $\beta$ value at the first position; means for determining at a second position differing from the first position a $\beta$ value at which j fitter becomes minimum and calculating a second difference between the $\beta$ value and a target $\beta$ value at the second position; corrected value calculation means for calculating a corrected value by use of the first difference and the second difference; means for correcting the measured $\beta$ value by means of the corrected value; and means for controlling recording power according to the corrected $\beta$ value and the target $\beta$ value.

The present invention is directed toward an optical disk drive that controls recording power according to a measured $\beta$ value and a target $\beta$ value.

The optical disk drive comprises: means for determining at a first position on an optical disk a $\beta$ value at which an error rate becomes minimum and calculating a first difference between the $\beta$ value and a target $\beta$ value at the first position; means for determining at a second position differing from the first position a $\beta$ value at which an error rate becomes minimum and calculating a second difference between the $\beta$ value and a target $\beta$ value at the second position; corrected value calculation means for calculating a corrected value by use of the first difference and the second difference; means for correcting the measured $\beta$ value by means of the corrected value; and means for controlling recording power according to the corrected $\beta$ value and the target $\beta$ value.

In one embodiment of the present invention, the first position is at an inner radius of the optical disk, and the second position is at an outer radius of the optical disk.

In another embodiment of the present invention, the corrected value calculation means calculates a corrected value at an arbitrary position by means of linear interpolation using the first difference and the second difference.

In yet another embodiment of the present invention, the corrected value calculation means calculates a corrected value at an arbitrary speed by means of linear interpolation using the first difference and the second difference.

In still yet another embodiment of the present invention, the corrected value calculation means calculates a corrected value at an arbitrary temperature by means of linear interpolation using the first difference and the second difference.

The present invention makes it possible to correct an error included in the measured $\beta$ value, thereby enabling performance of highly accurate control of recording power.

The invention will be more clearly comprehended by reference to the embodiments provided below. The following embodiments are illustrative, and the invention should not be limited to the embodiments.

BRIEF DESCRIPTION OF THE DRAWINGS

Preferred embodiments of the present invention will be described in detail by reference to the following drawings, wherein.

DETAILED DESCRIPTIONS

Embodiments of the present invention are hereunder described by reference to the drawings.

Figure 1:
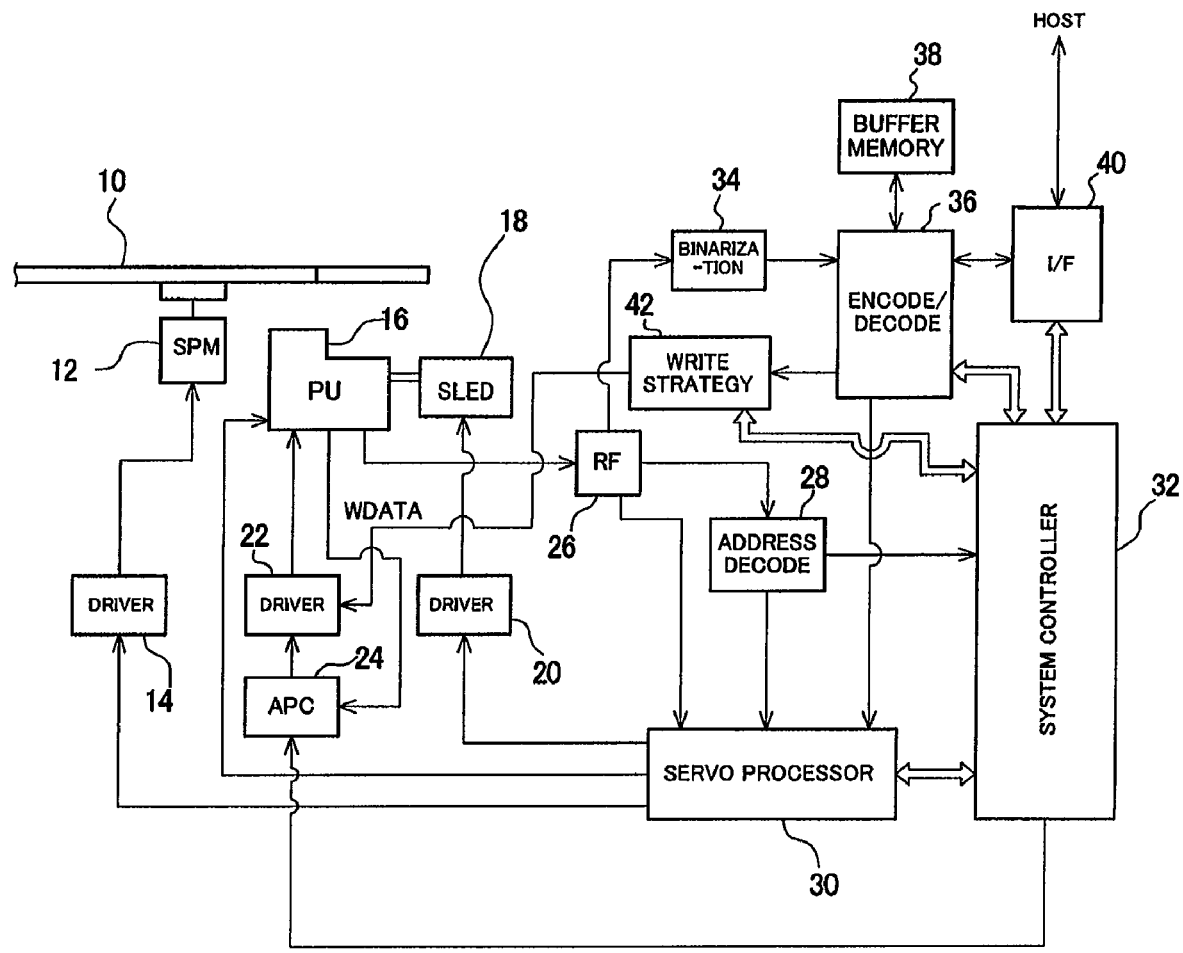
FIG. 1 is a diagram of an overall configuration of an optical disk drive of an embodiment.

FIG. 1 shows a diagram of an overall configuration of an optical disk drive of an embodiment. An optical disk 10 capable of recoding data is rotationally actuated by a spindle motor (SPM) 12. The spindle motor SPM 12 is driven by a driver 14, and the driver 14 is servo-controlled so as to achieve a desired rotational speed by a servo processor 30.

An optical pickup 16 includes a laser diode (LD) for irradiating the optical disk 10 with a laser beam and a photodetector (PD) that receives light reflected from the optical disk 10 and that converts the received light into an electric signal. The optical pickup 16 is disposed opposite the optical disk 10. The optical pickup 16 is actuated in a radial direction of the optical disk 10 by means of a sled motor 18, and the sled motor 18 is driven by a driver 20. The driver 20 is servo-controlled by the servo processor 30 in the same manner as is the driver 14. The LD of the optical pickup 16 is driven by a driver 22, and the driver 22 is controlled by an automatic power control circuit (APC) 24 in such a way that a drive current comes to a desired value. The APC 24 controls a drive current of the driver 22 in such a way that optimum recording power selected through OPC (Optimum Power Control) performed in a test area of the optical disk 10 is produced. Here, the word "OPC" generally means processing for recording test data by changing the recording power in the test area of the optical disk 10 in a plurality of stages, regenerating the test data, evaluating signal quality of the thus-regenerated test data, and selecting recording power at which desired signal quality is acquired. A β value, jitter, and an error rate are usually used for signal quality. Provided that a peak level of an RC-coupled, regenerated RF signal is taken as A and that a bottom level of the same is taken as B, the β value is determined as $$\beta=(A-B)/(A+B).$$

Jitter corresponds to a phase difference between a binarized signal produced from the regenerated RF signal and a sync clock signal. The APC 24 controls recording power in such a way that the β value thus determined by measurement comes to a target β value. On the contrary, the target β value is determined as a β value at which jitter and an error rate become minimum.

The optical disk 10 is irradiated with a laser beam of regeneration power from the LD of the optical pickup 16 at the time of regeneration of the data recorded in the optical disk 10, and the PD converts resultant reflected light into an electric signal. The electric signal is thus output. The regenerated signal output from the optical pickup 16 is supplied to an RF circuit 26. The RF circuit 26 generates a focus error signal and a tracking error signal from the regenerated signal and supplies the thus-generated signals to the servo processor 30. The servo processor 30 servo-controls the optical pickup 16 according to the error signals and maintains the optical pickup 16 in an on-focus state and an on-track state. The RF circuit 26 supplies a regenerated signal to an address decoding circuit 28. The address decoding circuit 28 is built from an address signal extraction block and a decoding block; binarizes the regenerated signal, to thus extract an address signal; decodes the thus-extracted address signal, thereby demodulating address data; and supplies the address data to the servo processor 30 and a system controller 32. The RF circuit 26 supplies the regenerated RF signal to a binarization circuit 34. The binarization circuit 34 binarizes the regenerated signal and supplies a resultant 8-16 modulated signal to an encoding/decoding circuit 36. The encoding/decoding circuit 36 subjects the binarized signal to 8-16 modulation and error correction, thereby producing regenerated data and outputs the regenerated data to a host machine, such as a personal computer, by way of an interface I/F 40. When the regenerated data are output to the host machine, the encoding/decoding circuit 36 temporarily stores the regenerated data in buffer memory 38 and subsequently outputs the same.

When data are recorded in the optical disk 10, data to be recorded, which are sent from the host machine, are supplied to the encoding/decoding circuit 36 by way of the interface I/F 40. The encoding/decoding circuit 36 stores into the buffer memory 38 the data to be recorded; encodes the data to be recorded; and supplies resultant data as 8-16 modulated data to a write strategy circuit 42. The write strategy circuit 42 converts the modulated data into a multipulse train according to a predetermined recording strategy and supplies the data as record data to the driver 22. The recording strategy is made up of; for instance, a pulse width of a starting pulse and a pulse width and a pulse duty of a subsequent pulse in a multipulse. Since the recording strategy affects recoding quality, a recording strategy is usually fixed to an optimum strategy. A recording strategy may also be simultaneously set during OPC. The laser beam whose power has been modulated by the record data is emitted from the LD of the optical pickup 16, whereupon data are recorded on the optical disk 10. After recording of data, the optical pickup 16 emits a laser beam of regeneration power, thereby regenerating the record data, and supplies the thus-regenerated data to the RF circuit 26. The RF circuit 26 supplies the regenerated signal to the binarization circuit 34, and binarized 8-16 modulated data are supplied to the encoding/decoding circuit 36. The encoding/decoding circuit 36 decodes the 8-16 modulated data and verifies the thus-decoded data against the record data stored in the buffer memory 38. A verification result is supplied to the system controller 32.

The optical disk drive of the present embodiment is configured as mentioned above, and control of recoding power using the β value is now described in detail. In the embodiment, the system controller 32 functions as means for calculating a difference between a β value at which jitter becomes minimum and a target β value; means for calculating a correction value by use of the difference; means for correcting the measured β value by means of the correction value; and means for controlling recording power according to the corrected β value and the target β value.

During OPC, test data are recorded by changing the recording power, and recording power at which the β value generated by regeneration of the recorded test data matches the target β value is taken as optimum recoding power. However, when the measured β value is inaccurate, optimum recording power consequently becomes in accurate, as a result of which recording quality becomes deteriorated.

The measured β value can contain an error. However, in light of the fact that the target β value is designed as a value at which jitter or an error rate becomes minimum, a β value at which jitter or an error rate becomes minimum, both of which are acquired as a result of regeneration of test data, is determined, and a difference between the β value and the target β value is considered as an error component included in the measured β value in the present embodiment. A correction is made to the measured β value by use of the error component.

Figure 2:
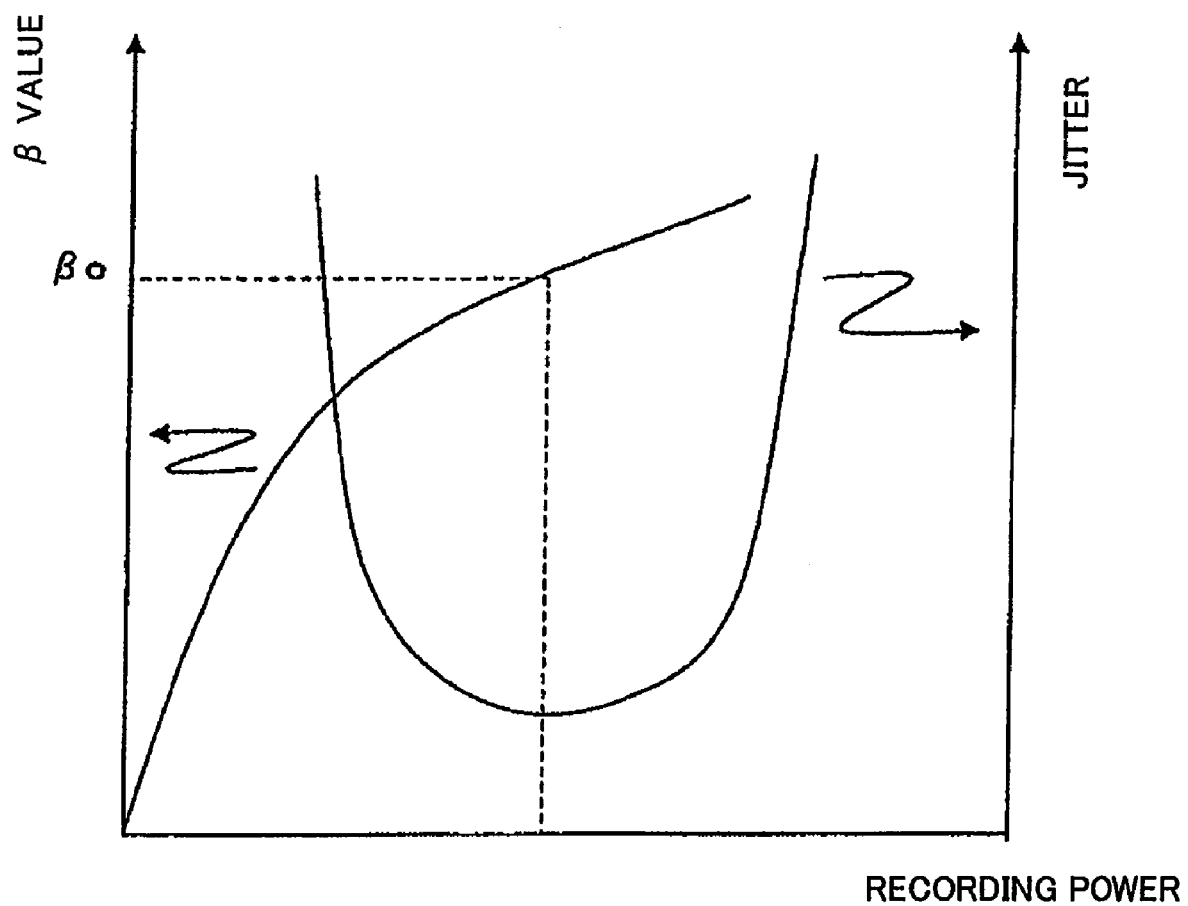
FIG. 2 is a graph showing a relationship among recording power, jitter, and a $\beta$ value.

FIG. 2 shows a relationship among the recording power, jitter, and the β value. Attention is paid to jitter; and when recording power becomes deficient, pits are not made. Even if pits are formed, they will be insufficiently made; hence, jitter increases. As the recording power increases, jitter successively decreases. When the recording power becomes excessive, pits are excessively made, whereby jitter increases once again. Therefore, jitter exhibits a U-shaped characteristic with an increase in recording power. In the meantime, when attention is paid to the β value, the β value generally exhibits a characteristic that monotonously increases with an increase in recording power.

Accordingly, a β value and jitter of test data are measured during OPC, and a β value at which jitter becomes minimum is determined. When measurement of the β value is accurate, the β value at which jitter becomes minimum should coincide with the target β value. If a difference exists between them, the measured β value is deemed to include an error, and the difference is calculated. Specifically, provided that the target β value is βt and that a β value at which jitter becomes minimum is βo, Δβ=βt−βo is determined through calculation. A result of calculation is an error included in the measured β value.

On the other hand, it is conceivable that the error will change according to a radial position of an optical disk, a temperature, and a speed. Therefore, an error between an inner radius and an outer radius of the optical disk is determined. At another arbitrary radial position, another arbitrary speed, and another arbitrary temperature, an error can be determined through linear interpolation.

Figure 3:
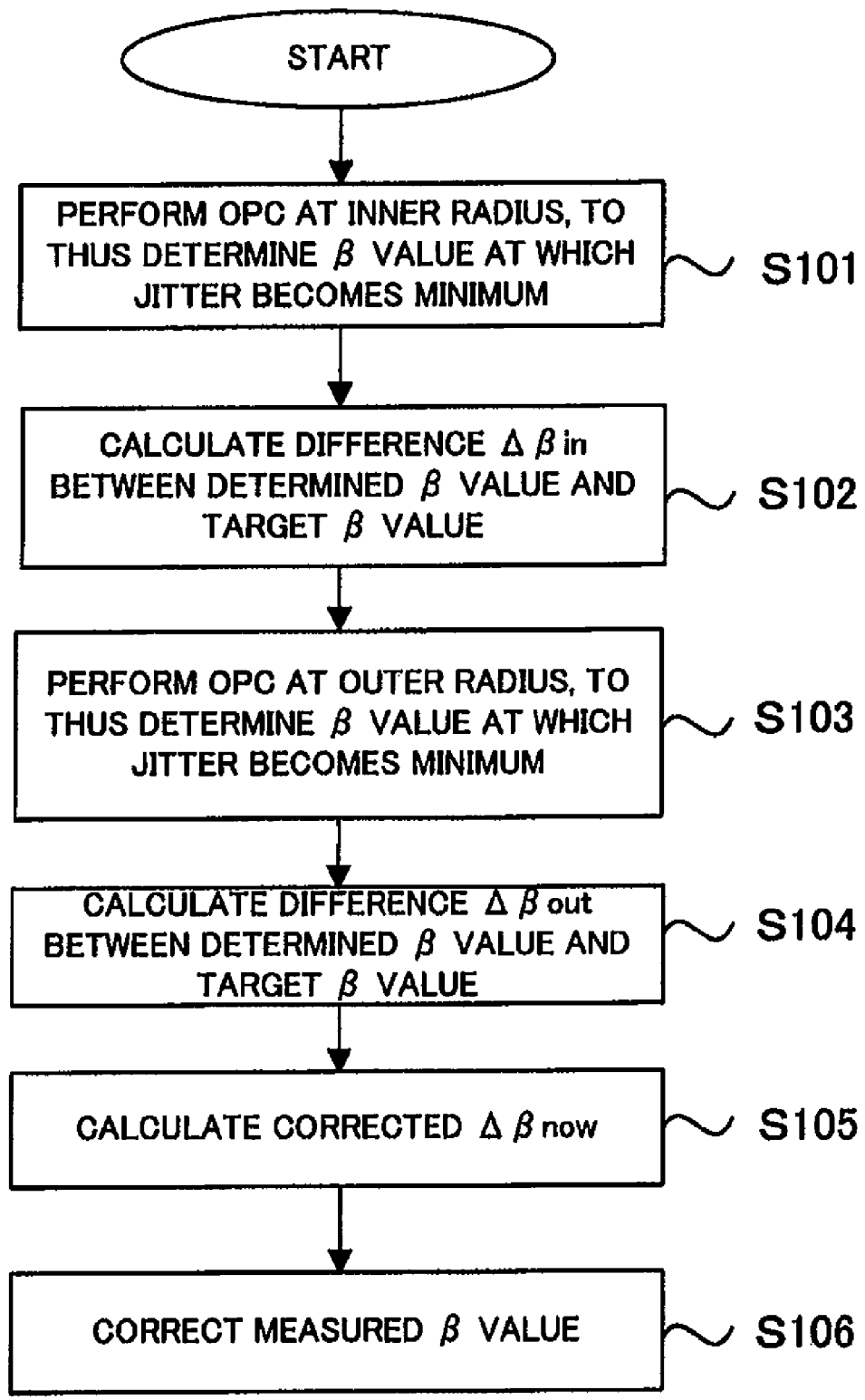
FIG. 3 is a flowchart for the embodiment.

FIG. 3 shows a processing flowchart of the embodiment.

First, the system controller 32 performs OPC in an inner radius of the optical disk (S101). Specifically, test data are recorded while recording power is being changed in a plurality of stages; recorded test data are regenerated; and a β value and jitter of the regenerated test data are measured. A β value at which jitter becomes minimum is determined.

After performance of OPC, the system controller 32 calculates a difference Δβ in between a target β value previously set in the inner radius and the β value (the β value at which jitter becomes minimum) determined in S101 (S102). A value previously recorded in the optical disk may also be read as a target β value, or a value may also be retrieved from a table provided for respective manufactures stored in the optical disk drive. Specifically, a table specifying target β values for respective manufactures are stored in advance in memory of the system controller 32. The system controller 32 reads a manufacturer of an optical disk on which data are to be recorded and acquires from a table a target β value commensurate with the thus-read manufacturer.

Next, the optical pickup is caused to perform seeking operation up to an outer radius of the optical disk, and OPC is performed in the outer radius (S103). Specifically, test data are recorded while recording power is being changed in a plurality of steps as in the inner radius, and the recorded test data are regenerated, and a β value and jitter of the thus-regenerated test data are measured. A β value at which jitter becomes minimum is determined.

After having performed OPC, the system controller 32 calculates a difference 413 out between the target β value set in advance in the outer radius and the β value (the β value at which jitter becomes minimum) determined in S103 (S104).

The thus-calculated differences Δβin and Δβout are errors of the measured β value, and the system controller 32 makes corrections to the measured β value by use of these errors. Specifically, a corrected value βnow is calculated at an arbitrary radial position, an arbitrary speed, and an arbitrary temperature by linear interpolation by use of the errors Δβin and Δβout (S105).

The corrected βnow value acquired at an arbitrary radial position is calculated as below, provided that a radial position achieved in the inner radius is Rin, a radial position achieved in the outer radius is Rout, and an arbitrary radial position is Rnow.

$$\Delta\beta now = \Delta\beta in + (Rnow - Rin)(\Delta\beta out - \Delta\beta in)/(Rout - Rin) \quad (1)$$

The corrected Δβnow value acquired at an arbitrary speed is calculated as below, provided that a speed achieved in the inner radius is Vin, a speed achieved in the outer radius is Vout, and an arbitrary speed is Vnow.

$$\Delta\beta now = \Delta\beta in + (Vnow - Vin)(\Delta\beta out - \Delta\beta in)/(Vout - Vin) \quad (2)$$

The corrected Δβnow value acquired at an arbitrary temperature is calculated as below, provided that a temperature achieved in the inner radius during OPC is Tin, a temperature achieved in the outer radius during OPC is Tout, and an arbitrary temperature is Tnow.

$$\Delta\beta now = \Delta\beta in + (Tnow - Tin)(\Delta\beta out - \Delta\beta in)/(Tout - Tin) \quad (3)$$

After having calculated the corrected Δβnow value as mentioned above, the system controller 32 makes a correction to the measured β value actually measured at a radial position, a speed, and a temperature (S106). Specifically, when retrospective OPC is performed at a certain radial position, the corrected Δβnow value calculated by Equation (1) is added to the β value measured at that position, thereby making a correction to the measured β value. Comparing the corrected β value with the target β value, the system controller 32 controls the recording power such that the target β value is acquired. When performing retrospective OPC at a certain speed, the system controller 32 adds the corrected Δβnow value calculated by Equation (2) to the β value measured at the speed, thereby making a correction to the measured β value. Recording power is controlled such that a target β value is acquired, by comparing the corrected β value with the target β value. Further, when performing retrospective OPC at a certain temperature, the system controller 32 adds the corrected Δβnow value calculated by Equation (3) to the β value measured at the temperature, thereby correcting the measured β value. The recording power is controlled such that a target β value is acquired, by comparing the corrected β value with the target β value.

Processing of the present embodiment is now specifically described by means of taking, as an example, a case where data are recorded in an optical disk where a constant speed is achieved on a per-zone basis.

Areas on the optical disk are assumed to be separated, in sequence from the inner radius toward the outer radius, a double speed (2×) area, a quadruple speed (4×) area, a sextuplet speed (6×) area, and an octuple speed (8×) speed area. The memory of the system controller 32 stores target β values for the respective areas. As a matter of course, the target β value may also be read from an optical disk and stored in the memory. Alternatively, a corresponding target β value may also be retrieved and acquired from the table by reading a manufacturer and a disk type from the optical disk.

First, the system controller 32 performs OPC at double speed in a test area of the inner radius (an OPC area) and measures a β value and jitter of the test area, thereby determining a β value at which jitter becomes minimum. A difference between the target β value achieved at the double speed and the β value at which jitter becomes minimum is calculated as Δβin.

The system controller 32 performs OPC at octuple speed in a test area of the outer radius and measures a β value and jitter of the test area, thereby determining a β value at which jitter becomes minimum. A difference between the target β value acquired at the octuple speed and the β value at which jitter becomes minimum is calculated as Δβout.

After calculated the Δβin and Δβout values, the system controller 32 calculates a corrected Δβnow value by use of any one of Equations (1), (2), and (3).

After having calculated the corrected Δβnow value, the system controller 32 corrects the measured β value by use of the corrected Δβnow value and compares the thus-corrected measured β value with the target β value, thereby controlling recording power. For instance, when recording power is controlled at the sextuplet speed area, the corrected Δβnow value of the sextuplet speed area is calculated by use of Equation (2). When the β value of the data recorded in the sextuplet speed area is measured, the corrected Δβnow value is added to the measured β value, thereby correcting the measured β value. The thus-corrected measured β value is compared with the target β value. When the corrected β value is smaller than the target β value, control is performed so as to increase the recording power. When the corrected β value is larger than the target β value, control is performed so as to decrease the recording power.

In the present embodiment, attention should be paid to the fact that recording power is controlled by intactly maintaining a preset target β value rather than correcting the same, making a correction to a measured β value, and comparing the corrected measured β value with the target β value. Specifically, a basic technical idea of the present embodiment lies in that a preset target β value is used, as it is, as a control target rather than a β value at which jitter or an error rate becomes minimum by performance of OPC being used as a new target β value in lieu of a preset target β value; that, when a difference exists between the β value at which jitter or an error rate becomes minimum by performance of OPC and the target β value, the difference is deemed to have occurred because of an error included in a measured β value; and that the measured β value is corrected by use of the difference. In the present embodiment, since the target β value is used, as it is, as a control target, effective utilization of the target β value is conceived.

In the present embodiment, a β value is controlled in a production line at normal temperature in many cases. When the optical disk drive is actually used at a high or low temperature, there arises a β value difference attributable to a difference between the temperature at which the β value was controlled and the temperature at which the optical disk drive is actually used. However, in the present embodiment, even when a temperature difference exists, a corrected value can be calculated in consideration of the temperature difference, so that recording power can be controlled with high accuracy.

Although the embodiment of the present invention has been described thus far, the present invention is not limited to the embodiment and susceptible to various modifications.

For instance, in the present embodiment, a difference between the β value at which jitter becomes minimum and the target β value is calculated. However, a difference between a β value at which an error rate becomes minimum and the target β value can also be calculated.

In the present embodiment, although the corrected Δβnow value is calculated according to any one of Equations (1), (2), and (3), the corrected Δβnow value can be calculated by any two of the three equations or all of the equations, and any one of the thus-calculated Δβnow values can also be selectively used in accordance with a given criterion.

Moreover, in the present embodiment, OPC is performed in both the OPC area of the inner radius and the OPC area of the outer radius, whereby Δβin and Δβout values are calculated. However, the OPC areas are not always limited to the inner radius and the outer radius. The essential requirement for the locations of the OPC areas is that a difference between a β value at which jitter or an error rate becomes minimum and a target β value be calculated at two arbitrary positions on the optical disk. Requirements for the two arbitrary positions are that a β value and jitter or an error rate can be measured at the positions and that target β values are previously set at that positions. A corrected 13 now value at a position other than the two arbitrary positions is calculated from a difference Δβ between the two arbitrary positions by means of interpolation. Therefore, two arbitrary positions spaced apart from each other are said to be more desirable than two arbitrary positions situated close to each other.

The calculated, corrected Δβ value in the present embodiment can be utilized for measurement of a β value performed to ascertain recording quality at an arbitrary position. Example measurement is retrospective OPC. Specifically, recording is interrupted during the course of data recording, and immediately preceding recorded data are regenerated, to thus calculate a β value. Recording power used for continually writing additional data is corrected according to a difference between the thus-calculated β value and the target β value.

Moreover, in the present embodiment, a corrected 413 now value is calculated by use of differences Δβin and Δβout. However, the corrected Δβ value can also be calculated by use of values that are determined by multiplying the respective differences Δβin and Δβout by a coefficient which is less than one. Specifically, provided that a coefficient is α (α<1), the corrected Δβnow value can also be calculated by any of the following Equations:

$$\Delta\beta now = \alpha \cdot \Delta\beta in + (R now - R in)(\alpha \cdot \Delta\beta out - \alpha \cdot \Delta\beta in)/(R out - R in) \quad (4)$$

$$\Delta\beta now = \alpha \cdot \Delta\beta in + (V now - V in)(\alpha \cdot \Delta\beta out - \alpha \cdot \Delta\beta in)/(V out - V in) \quad (5)$$

$$\Delta\beta now = \alpha \cdot \Delta\beta in + (T now - T in)(\alpha \cdot \Delta\beta out - \alpha \cdot \Delta\beta in)/(T out - T in) \quad (6)$$

Although the coefficient α used for multiplying the differences Δβin and Δβout is assumed to be single, the difference Δβin can be multiplied by the coefficient α, and the difference Δβout can be multiplied by a coefficient γ (γ<1) that differs from the coefficient α.

What is claimed is:

1. An optical disk drive that controls recording power in accordance with a measured β value and a target β value, the drive comprising:
   means for determining at a first position on an optical disk a β value at which jitter becomes minimum and calculating a first difference between the β value and a target β value at the first position;
   means for determining at a second position differing from the first position a β value at which jitter becomes minimum and calculating a second difference between the β value and a target β value at the second position;
   corrected value calculation means for calculating a corrected value by use of the first difference and the second difference;
   means for correcting the measured β value by means of the corrected value; and
   means for controlling recording power according to the corrected β value and the target β value.

2. The optical disk drive according to claim 1, wherein the first position is at an inner radius of the optical disk, and the second position is at an outer radius of the optical disk.

3. The optical disk drive according to claim 1, wherein the corrected value calculation means calculates a corrected value at an arbitrary position by means of linear interpolation using the first difference and the second difference.

4. The optical disk drive according to claim 1, wherein the corrected value calculation means calculates a corrected value at an arbitrary speed by means of linear interpolation using the first difference and the second difference.

5. The optical disk drive according to claim 1, wherein the corrected value calculation means calculates a corrected value at an arbitrary temperature by means of linear interpolation using the first difference and the second difference.

6. An optical disk drive that controls recording power in accordance with a measured β value and a target β value, the drive comprising:
- means for determining at a first position on an optical disk a β value at which an error rate becomes minimum and calculating a first difference between the β value and a target β value at the first position;
- means for determining at a second position differing from the first position a β value at which an error rate becomes minimum and calculating a second difference between the β value and a target β value at the second position;
- corrected value calculation means for calculating a corrected value by use of the first difference and the second difference;
- means for correcting the measured β value by means of the corrected value; and
- means for controlling recording power according to the corrected β value and the target β value.

7. The optical disk drive according to claim 6, wherein the first position is at an inner radius of the optical disk, and the second position is at an outer radius of the optical disk.

8. The optical disk drive according to claim 6, wherein the corrected value calculation means calculates a corrected value at an arbitrary position by means of linear interpolation using the first difference and the second difference.

9. The optical disk drive according to claim 6, wherein the corrected value calculation means calculates a corrected value at an arbitrary speed by means of linear interpolation using the first difference and the second difference.

10. The optical disk drive according to claim 6, wherein the corrected value calculation means calculates a corrected value at an arbitrary temperature by means of linear interpolation using the first difference and the second difference.

* * * * *